Feb. 13, 1945. F. T. COURT 2,369,436
POWER LIFT
Filed Nov. 7, 1941 4 Sheets-Sheet 1

INVENTOR
FRANK T. COURT
BY

ATTORNEY

Feb. 13, 1945. F. T. COURT 2,369,436
POWER LIFT
Filed Nov. 7, 1941 4 Sheets-Sheet 2

INVENTOR
FRANK T. COURT
BY 
ATTORNEY

Feb. 13, 1945.  F. T. COURT  2,369,436
POWER LIFT
Filed Nov. 7, 1941  4 Sheets-Sheet 3

INVENTOR
FRANK T. COURT
BY 
ATTORNEY

Feb. 13, 1945.   F. T. COURT   2,369,436
POWER LIFT
Filed Nov. 7, 1941   4 Sheets-Sheet 4

FIG. 10

INVENTOR
FRANK T. COURT

ATTORNEY

Patented Feb. 13, 1945

2,369,436

UNITED STATES PATENT OFFICE 2,369,436

POWER LIFT

Frank T. Court, Moline, Ill., assignor to Deere & Company, Moline, Ill., a corporation of Illinois Application November 7, 1941, Serial No. 418,199

25 Claims. (Cl. 97—50)

The present invention relates generally to agricultural implements and more particularly to power-actuated means for adjusting implement parts and moving them into transport or inoperative position.

The object and general nature of the present invention is the provision of new and improved adjusting and lifting connections between a power operated unit or units on a tractor and the implement part or parts which include flexible elements, such as chains or cables, passing through or adjacent the pivotal connection between the implement and the tractor, whereby with a simple connection with the implement, and with the principal parts of the lifting and adjusting units on the tractor, the implement may be easily and conveniently controlled by the operator of the tractor.

More specifically, it is a feature of this invention to provide lifting and adjusting connections of this kind by which a ground working implement, such as a plow, may be adjusted to secure the desired depth of operation, raised or lowered into or out of transport position, and adjusted for level by means on the tractor and connected through flexible elements with the implement. It is also a particular feature of this invention to provide two operating units on the tractor and connected through two flexible elements with two movable parts of the implement whereby to adjust two functions of the latter. Particularly, it is a feature of this invention to provide adjusting connections between a tractor and an implement, such as a combine, in which a pair of units on the tractor are connected through suitable flexible connections passing through or adjacent the pivot with the platform and reel lifting or adjusting means on the combine.

Still further, it is an important feature of this invention to provide a power control for an implement in which provision is made for automatic release of the implement from the tractor in the event of an overload, and further it is a feature of this invention to provide means in the lifting connections whereby extension of the hitch between the tractor and the implement, as when cushioning shocks and the like, is accommodated without in any way interfering with the control of the implement by the unit or units on the tractor. More specifically, it is a feature of this invention to provide a power actuated unit on the tractor connected with the implement part or parts to be adjusted through a flexible connection, which connection includes a parallelogram linkage that automatically accommodates extension of the hitch between the tractor and the implement when accommodating cushioning of the draft pull, and it is a further feature of this invention to provide a parallelogram linkage which is adapted to be automatically released when the implement is released from the tractor by an overload release hitch or some other means.

These and other objects and advantages of the present invention will be apparent to those skilled in the art after a consideration of the following detailed description, taken in conjunction with the accompanying drawings, in which.

Referring now to the drawings, more particularly to Figures 1 to 6, inclusive, the reference numeral 1 indicates a tractor which is more or less of conventional construction and hence has been illustrated only diagrammatically. The tractor 1 includes rear drive wheels 2 fixed to drive axles 3 that are journaled for rotation in a rear axle housing 4. The latter is secured to or forms a part of a transmission housing 5. The tractor 1 includes a power unit 6, preferably in the form of a hydraulic cylinder 8 in which a piston connected to a piston rod 9 is movable under the control of valve means (not shown). The piston rod 9 is connected by a link 11 to an arm 12 that is fixed to a rock shaft 13 journaled for rocking motion in suitable brackets 14 on the tractor. A depth adjusting and power lift arm 15 is fixed at its upper and forward end to the rock shaft 13.

The tractor 1 is provided with a drawbar 18 that is connected to the lower portion of the rear axle housing 4 by means of a frame or drawbar support 19. The drawbar 18 may be connected to the drawbar support 19 for generally laterally swinging movement relative to the tractor, or it may be connected thereto by means that prevents the drawbar 18 from swinging laterally.

Figures 1, 2:
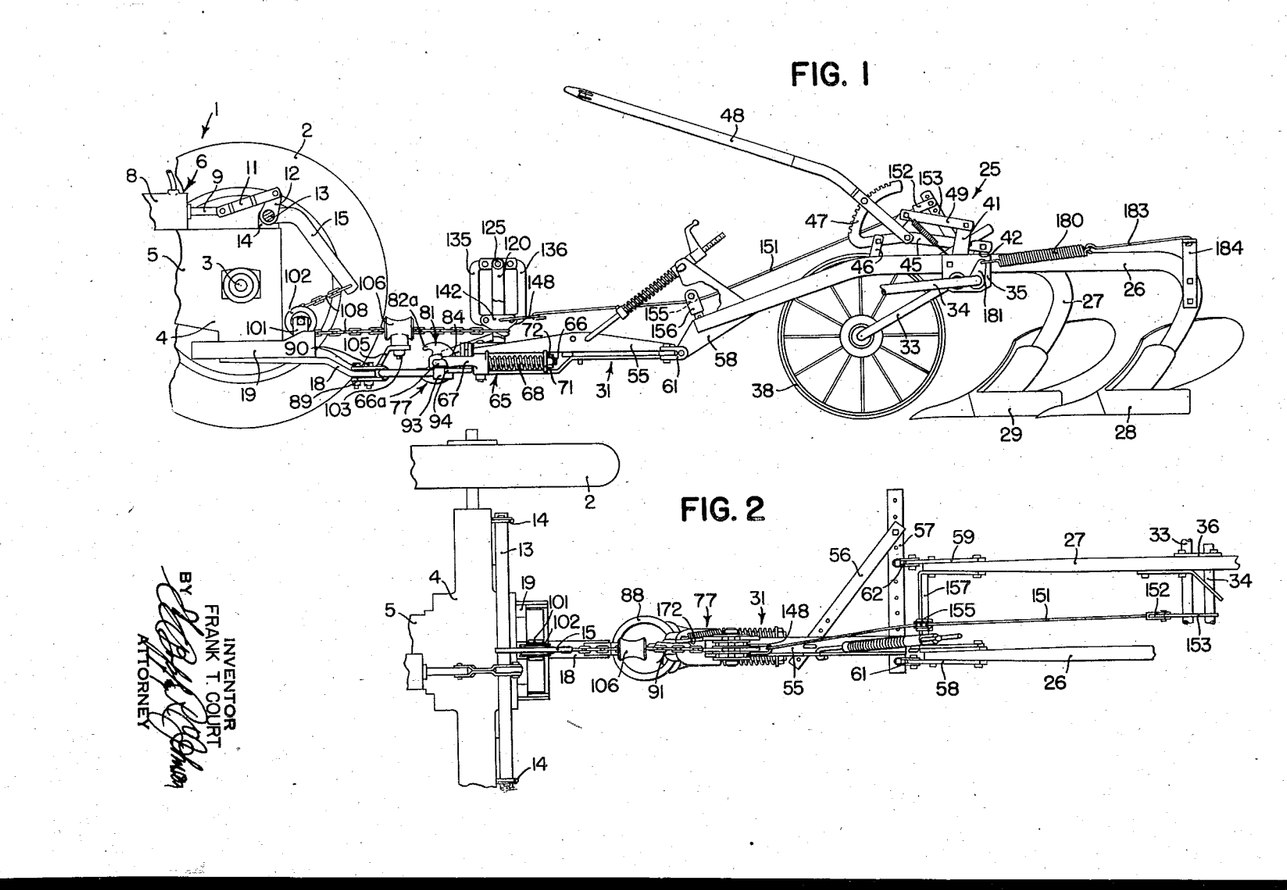
Figure 1 is a fragmentary side view of a tractor and towed plow, in which the depth of operation and the raising of the plow into transport position is controlled by a power operated unit on the tractor, with provision for automatically releasing the connection when the plow is released as by an overload.
Figure 2 is a partial plan view of the outfit shown in Figure 1.

The implement that I have shown in Figures 1 and 2 as connected in operative relation with the tractor 1, comprises a plow 25 of the two bottom towed type. The plow 25 includes a pair of plow beams 26 and 27 to the lower rear ends of which plow bottoms 28 and 29 are connected in the usual fashion. The forward ends of the beams 26 and 27 are connected to a vertically swingable hitch indicated in its entirety by the reference numeral 31 which will be referred to later. A pair of crank axles 33 and 34 are journaled for rocking movement in brackets 35 and 36 that are secured, respectively, to the plow beams 26 and 27, and each of the crank axles includes a laterally turned end upon which a ground wheel 38 is mounted. The ground wheel 38 shown in Figure 1, constitutes the right furrow wheel of the plow, and the other ground wheel (not shown) constitutes the land wheel of the plow, and hence the crank axle 34 upon which the land wheel is journaled is disposed normally in a position above the furrow wheel crank axle 33. In operation, the relation between the crank axles is varied, according to the depth of plowing, in order that the land and furrow wheels may be disposed in a position in which the two plow bottoms 28 and 29 are level. In order to level the plow shown in Figure 1, an arm 41 is fixed to the central portion of the crank axle 33 while another arm 42 is fixed to the central portion of the crank axle 34. A link 45 extends forwardly from the rear arm 42 and at its forward end is supported by a swinging link 46 and is provided with a sector 47 with which a landing lever 48 cooperates. The landing lever 48 is connected by a link 49 to the other arm 41, whereby movement of the lever 48 varies the relation between the crank axles 33 and 34 and thus levels the plow. The means for adjusting the depth of plowing and for raising and lowering the plow into and out of transport position will be described below.

The hitch 31 mentioned above, includes a longitudinal draft member 55 and a diagonal brace 56, to the rear ends of both of which a transverse bar 57 is connected. Forward draft brackets 58 and 59 are fixed to the forward ends of the plow beams 26 and 27 and are connected, respectively, by clevises 61 and 62 to the transverse hitch bar 57, the latter member having a plurality of openings therein to receive the clevises 61 and 62 in different positions of lateral adjustment, depending upon the width or tread of the tractor 1.

The forward end of the hitch member 55 is formed as a frame, indicated at 65 in Figure 1, in which a draft bolt 66 is slidably mounted, the frame 65 including a casting 67 at the forward end of the draft member 55. The draft member 66 is generally in the form of a U-shaped bolt, the ends of which are disposed within cushioning springs 68 that are confined between the rear end of the casting 67 and a slidable washer 71 which is apertured to receive the ends of the draft bolt 66, which ends are threaded to receive nuts 72 by which the plate 71 is held in place.

Figure 3:
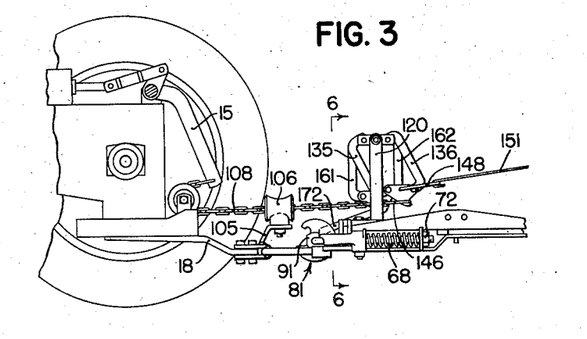
Figure 3 is a partial view similar to Figure 1, but showing the parts in the position they occupy when the plow is arranged for its deepest plowing position, the parallelogram linkage being swung rearwardly.

The parts just described form a part of a spring cushion release hitch indicated in its entirety by the reference numeral 77, the details of which do not per se form a part of the present invention, being disclosed and claimed in the patent application, Serial No. 268,731, filed April 19, 1939, by Carl G. Strandlund, to which reference may be had if necessary. Briefly, the spring cushion release hitch 77, in addition to the parts described above, includes a rotatable coupling member 81 mounted for rotation on the forward end 66a of the slidable draft bolt 66. The rotatable coupling member 81 includes sections 82 and 82a which are formed as draft hooks and other sections 84 which form abutments engageable with the upper forward portion of the casting 67. When one of the abutments 84 engages the frame member 67, the draft hook 82 of the other section is in a position to receive a draft or connecting member 88, preferably in the form of a ring to which is welded a clevis 89 that is bolted as at 90 to the rear end of the tractor drawbar 18. As best shown in Figure 1, the rotatable coupling member 81 is provided with a hub of generally square configuration, indicated by the reference numeral 91, which abuts against the forward end of the frame casting 67 and projects above the front end of the member 67 for a purpose which will appear later. The ring member 88, as best shown in Figure 2, is of substantial diameter and is so constructed that the implement and tractor may swing laterally, one with respect to the other generally about the center of the ring member 88, and to guide the relative movement between the ring member 88 and the lower draft hook of the rotatable coupling member 81, I have provided a plate 93 of curved configuration and welded to a support 94 an upward extension 95 of which (Figure 5) extends upwardly through an opening 96 in the frame casting 67. The extension 95 is provided with a latch 98 which releasably holds the support 94 and the curved plate 93 in position constraining the ring 88 to move relative to the coupling member 81 generally about a pivot passing through the center of the ring 88. As best shown in the Strandlund application identified above, when the pull is transmitted through the drawbar 18 and the ring member 88 to the hitch 31 through the rotatable coupling member 81 exceeds the strength of the cushioning springs 68, the latter yield, permitting the rotatable coupling member 81 to move the rotatable member 81, the links 165 and 166 are prevented from turning in a clockwise direction (Figure 3), and since the plates 165 and 166 are restrained against turning, the shaft 125 and also the other plates 141 and 142 are likewise restrained against turning in a clockwise direction about a transverse axis, for the links 135 and 136 permit only a parallel movement of the plates 141 and 142 so long as the shaft 125 is held against rocking movement. However, when the power lift arm 15 is moved toward the tractor, the chain 108 moves rearwardly, and since the rear end of the chain 108 is connected by the elongated link 146 with the hook portion 145 of the plates 141 and 142, the latter, together with the links 135 and 136, swing rearwardly, thus permitting the flexible rod 151 to move rearwardly and the arm 153 to rock rearwardly, whereby both crank axles swing upwardly, permitting the plow bottoms to operate at an increased depth. It will be observed that the reaction of the weight of the implement and the section of the plow bottoms, which tends to swing the crank axles 33 and 34 generally upwardly, is restrained by a pull exerted through the rod 151 and the chain 108 against the power lift arm 15, and it will also be noted that these elements are connected to the plates 141 and 142 in eccentric relation whereby the pull transmitted between the elements 108 and 151 tend to cause the plates 141 and 142 to rock in a clockwise direction about a transverse axis. This tendency, however, is resisted, due to the fact that the other plates 165 and 166 are prevented from rocking so long as the forward end of the link 172 is anchored back of the square hub 91 on the rotatable coupling member 81, yet this restraint of the plates 141 and 142 against rocking about a transverse axis does not in any way interfere with the permissive longitudinal swinging movement of the plates in a generally fore and aft direction, as will be seen by comparing the positions of these parts as shown in Figures 1 and 3. Therefore, rocking movement of the power lift arm 15, whether in one direction or the other, is transmitted immediately through the chain 108 and the flexible rod 151 to the arm 153 on the rear crank axle 34, both crank axles 33 and 34 being constrained for rocking movement together so long as the leveling lever 48 is locked to its sector 47. Thus, by virtue of the mechanism just described, there is a direct connection between the power unit on the tractor and the part on the implement that is to be moved from one position to the other, and such connection is in the nature of a flexible connection, one portion of which passes through the guide sleeve 106, which is mounted adjacent the axis of lateral swinging of the implement relative to the tractor, whereby changes in the lateral position of the implement relative to the tractor will have no material effect upon the raising and lowering of the tools.

Figure 4:
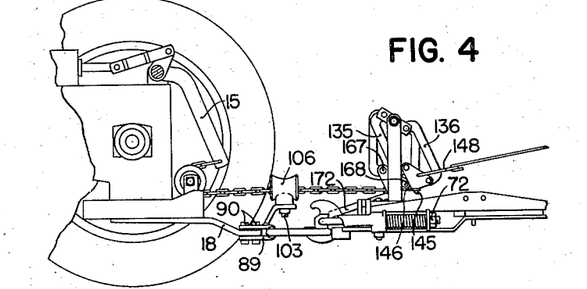
Figure 4 is a view similar to Figure 3, but showing the position of the parts when the spring cushion release hitch yields to accommodate a momentary shift in the position of the implement relative to the tractor but before the latter has actually been released from the implement.

Reference was made above to the fact that the spring cushion release hitch 77 yields to absorb shocks and the like, and that such yielding takes place by longitudinal movement of the draft bolt 66 in the frame casting 67. This possible yielding of the hitch connection 77 is automatically compensated for by the parallelogram linkage described above. Referring now to Figures 3 and 4, and remembering that the plates 165 and 166 are normally restrained against rocking movement about the axis of their shaft 176 because the front end of the link 172 is anchored behind the hub of the rotatable coupling member 81, assume, therefore, that conditions have arisen in which the draft pull causes the springs 68 to compress and the draft bolt 66 to move longitudinally forwardly a small distance relative to the frame casting 67. This movement will, of course, carry the rotatable coupling member 81 and its hub 91 forwardly relative to the part of the hitch upon which the standard 120 is fixed. Since the elements 108 and 151 are connected to the plates 141 and 142 in eccentric relation, the pull transmitted through these elements exert a constant tendency to cause the plates 141 and 142 to rock in a clockwise direction, which tendency is transmitted through the parallelogram linkage to the pivoted plates 165 and 166. Therefore, when the springs 68 yield, permitting the rotatable coupling member 81 to move forwardly, the link 172 moves forwardly with the coupling member, which forward movement then permits the plates 165 and 166 to rock into a position corresponding to that shown in Figure 4, and since the plates 165 and 166 are permitted to rock, so are the swingably mounted plates 141 and 142 likewise permitted to rock through substantially the same extent (Figure 4). This has the effect, therefore, of automatically increasing the effective length of the flexible connection 108, 151 by substantially exactly the same amount that the distance between the tractor and the implement is increased due to the yielding of the springs 68. Thus, by virtue of the present invention, the connection between the power unit on the tractor and the part to be operated on the implement is automatically increased or decreased according to the yielding of the cushion springs 68, yet in any position movement of the power lift arm 15 will cause the desired corresponding movement of the implement part adapted to be controlled thereby.

Figure 5:
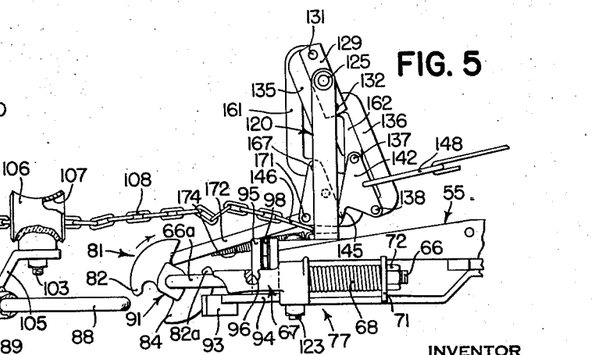
Figure 5 is a larger view, showing the position of the parts at the moment the tractor and implement are disconnected as a result of the yielding of the hitch under an execessive load.

The spring cushion release hitch 77 is also adapted, as described above, to automatically release the tractor if the pull becomes excessive, and according to the present invention the connection between the chain 108 and the rod 151 is also automatically released with the release of the hitch 77. This is accomplished in the following manner: When the abnormal pull becomes excessive and the springs 68 yield sufficiently to permit the draft bolt 66 to be pulled forwardly an extent sufficient to cause the abutment 84 to clear the end of the casting 67, the pull of the tractor, transmitted to the rotatable coupling member 81 through the ring 88 at a point below the axis of rotation of the coupling member 81 on the front end of the draft bolt 66, causes the immediate rotation of the rotatable coupling member 81 in the direction of the arrow shown in Figure 5, and this rotation permits the ring 88 to move out of the draft hook 82. At the same time, the rotation of the rotatable coupling member 81 also causes the hub 91 to rotate, and as soon as the adjacent corner of the hub, against which the link 172 bears, moves in a clockwise direction, and as soon as the hub moves into an inclined position, the reaction of the force transmitted by the flexible elements 108 and 151, and transmitted through the rockable shaft 125 and the arms 126—129, immediately causes the rockable plates 165, 166 to swing in a clockwise direction (Figure 5), forcing the link 172 forwardly and at the same time permitting the plates 141, 142 to move into a position, as shown in Figure 5, in which the link 146 at the rear end of the chain 108 is free to disengage from the hook forwardly, the abutment 84 sliding along the upper portion of the front end of the casting 67. This permits the hitch to cushion sudden shocks and the like, but the tractor and implement are not disconnected from each other unless the excessive pull is continued and reaches a predetermined amount, depending upon the adjustment of the nuts 72. However, if this point is exceeded the draft pull moves the draft bolt 66 forwardly through the frame casting 67 until the abutment section 84 rides off of the front end of the casting member 67, whereupon the rotatable coupling member 81 is permitted to rotate generally into the position shown in Figure 5, freeing the drawbar ring 88 from connection with the hitch 31. At the same time, the other draft hook section 82a will be moved toward a position in which it may be reengaged with the drawbar ring 88.

Coming now to the controlling connections between the implement 25 and the power unit 6 on the tractor, with which the present invention is more directly concerned, it will be noted that the drawbar supporting member 19 carries a bracket 101 (Figure 1) on which a sheave 102 is journaled. A standard 105 is secured, as by welding or the like, to the ring 88 and is inclined rearwardly to bring its upper end substantially in the center line of the ring 88. To the upper end of the standard 105 a guide sleeve 106 is swiveled, as by a bolt 103, the guide member 106 being in the form of a tube or sleeve of venturi-like construction, having curved relatively smooth inner walls 107. A flexible element in the form of a chain 108 is connected at its forward and upper end to the lower end of the power lift arm 15 and is trained over the sheave 102 and through the guide ring or sleeve 106.

Figure 6:
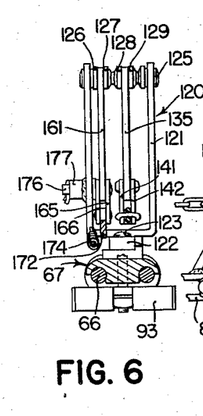
Figure 6 is an enlarged sectional view taken along the line 6—6 of Figure 3.

Referring now more particularly to Figures 5 and 6, a standard 120 which includes a U-shaped member 121 and a base 122 is mounted on the hitch member 55 by means of a bolt 123 that extends downwardly through an opening in the base 122 and an opening in the casting 67. The upper ends of the U-shaped member 121 are apertured to receive a shaft 125 which is rockable therein. The shaft 125 carries two pairs 126, 127 and 128, 129 of arms which are fixed to the shaft 125. The outer ends of each of said arms are apertured to receive pivot pins 131 and 132 (Figure 5). Mounted in depending relation on the pivot pins 131 and 132 of the left hand pair of arms 128, 129 is a pair of links 135 and 136, and the lower ends of the links 135 and 136 are apertured to receive pivot pins 137 and 138 that extend through a pair of triangular plates 141, 142 (Figure 6). The links 135 and 136 are of equal length, and the distance between the pivots 137 and 138 is equal to the distance between the upper pivots 131 and 132, this construction thus providing a parallelogram linkage in which the pair of triangular plates 141, 142 take the same angular position as the upper arms 128, 129. The lower portion of the plates 141 and 142 is provided with a draft receiving hook 145 which is normally adapted to be engaged by the rear elongated link 146 at the rear end of the chain 108, as best shown in Figures 1, 3 and 4. A loop 148 extends through aligned openings in the triangular plates 141 and 142 substantially midway between the pivots 137 and 138, and hence occupies the same position as regards the triangular plates 141 and 142 as does the shaft 125 relative to the upper pivot pins 131 and 132. The longitudinally extending rod 151 is connected at its forward end with the loop 148 and at its rear end is adjustably connected, as by a clevis 152, to the upper end of an arm 153 the lower end of which is fixed to the central portion of the crank axle 34. The link 151 is in the form of a flexible rod or cable and passes underneath a sheave 155 (Figure 1) rotatable in a bracket 156 fixed to a cross bar 157 connecting the forward ends of the plow beams 26 and 27.

A second pair of depending links 161 and 162 are pivoted at the upper ends to the ends of the arms 126 and 127 and at their lower ends are pivoted to a pair of triangular plates 165 and 166, the pivots at the upper ends of the links 161 and 162 being in line with the pivot pins 131 and 132. The pivot pins at the lower ends of the links 161 and 162 are indicated in Figure 4 by the reference numerals 167 and 168, these pivots being spaced apart the same distance as the pivots 137 and 138. Also, the triangular plates 165 and 166 are of the same configuration as the plates 141 and 142. The pivot plates 165 and 166 carry another pivot 171, disposed thereon in a position corresponding to the position of the hook section 145 relative to the pivots 137 and 138, and a link 172 is connected at its rear end to the plates 165 and 166 through the pivot 171. The forward end of the link 172 is formed to engage against the hub 91 (Figures 1 and 4) of the rotatable coupling member 81, and is biased for movement into this position by a spring 174 which is connected at one end to the forward portion of the link 172 and at the other end to the right side of the U-shaped standard 121, as best shown in Figure 6. The two triangular plates 165 and 166 are fixed to a shaft 176 which is rotatably mounted in a sleeve 177 fixed to the right side member of the U-shaped standard 121 (Figure 6), whereby the pair of plates 165, 166 is mounted for rocking movement in the standard 121 but is prevented from swinging, while the other pair of plates 141, 142 is permitted to swing (see Figures 1 and 3) as well as rock angularly (Figure 4), but the plates 141 and 142 may rock angularly only when the plates 165 and 166 rock, which motion is transmitted through the vertical links 161, 162 to the upper shaft 125, rocking movement of the arms 128 and 129 with the shaft 125 thus permitting the longitudinally swingable plates 141 and 142 to also rock, as for example from the position shown in Figure 3 to the position shown in Figure 4.

The operation of the mechanism as so far described is substantially as follows.

The outfit as shown in Figure 1 is in operating position, the chain 108 and the flexible rod 151 being connected, respectively, with the power lift arm 15 of the tractor and the arm 153 of the implement, the chain 108 and the flexible rod 151 being connected together through the two interposed parallelogram linkages comprising the pairs of links 135, 136 and 161, 162. When operating with the parts arranged as shown in Figure 1, any tendency for the plow bottoms 28 and 29 to run deeper than desired is restrained by the ground wheels. If, for example, it should be desired to increase the depth of plowing the power unit 6 on the tractor is actuated so as to cause the power lift arm 15 to move from the position shown in Figure 1 to the position shown in Figure 3, the lower end of the arm 15 approaching the tractor and permitting the chain 108 to move rearwardly. Since the link 172 has its forward end engaged behind the hub 91 of section 145. Thus, whenever the draft loads become abnormal to an extent sufficient to cause the release of the hitch, the rotation of the coupling member 81 of the hitch acts practically simultaneously therewith to disengage the connections between the chain 108 and the rod 151. Moreover, the yielding of the springs 68 of the hitch prior to actual release of the ring 88 is effective to cause an automatic compensation in the positions of the rockable plates 141, 142 so that the change in the position of the tractor relative to the implement at such time does not cause any raising or lowering of the tools. Figure 5 shows the positions of the parts substantially at the moment of release, but after the release has occurred the parts, particularly those of the parallelogram linkages, return to a normal position, such as is shown in Figure 1, so that when the tractor is reconnected with the hitch, it is a simple matter to reconnect the link 146 with the hook section 145 of the plates 141, 142. Preferably, this is done by actuating the power unit 6 so as to swing the left arm 15 into its forwardmost position, thereby providing sufficient slack to permit the operator to engage the link 146 over the hook member 145 when the latter is in a normal position, such as in Figures 3 and 4. Then by actuating the lift arm 15 to swing it into the position to secure the desired operating depth of the plow bottoms, the outfit is again ready for operation.

From Figure 1 it will be noted that the flexible rod 151 is engaged under the sheave 155 at the front end of the plow beams. This particular construction is desirable so as to prevent the front end of the plow from being pulled downwardly, as might occur if there were a direct connection between the plates 141, 142 back to the arm 153, for the front end of the plow is pivoted to the rear end of the hitch, at the clevises 61 and 62, and a direct pull on the arm 153 might tend to throw the front ends of the plow beams downwardly. However, when the rod 151 is arranged to pass underneath the sheave 155, there is established a component of the pull exerted through the rod 151, which component acts to hold the front ends of the plow beams up in position, both during the depth adjusting range and also during the raising range.

A spring 180 is connected at its front end to a bracket 181 fast to the land wheel crank axle 34, and at its rear end the spring 180 is connected by a link 183 to a bracket 184 secured to the rear end of the plow beam 26. The function of the spring 180 is three-fold. First, it serves to add the weight of the wheel or wheels to the plow so as to aid in starting the bottoms into the ground and securing the desired penetration. Second, it serves to maintain the chain 108, the rod 151, and associated connections tight at all times, thereby eliminating slack, and it aids in forcing the oil out of the cylinder 8 when lowering the plow bottoms toward operating position.

Figure 7:
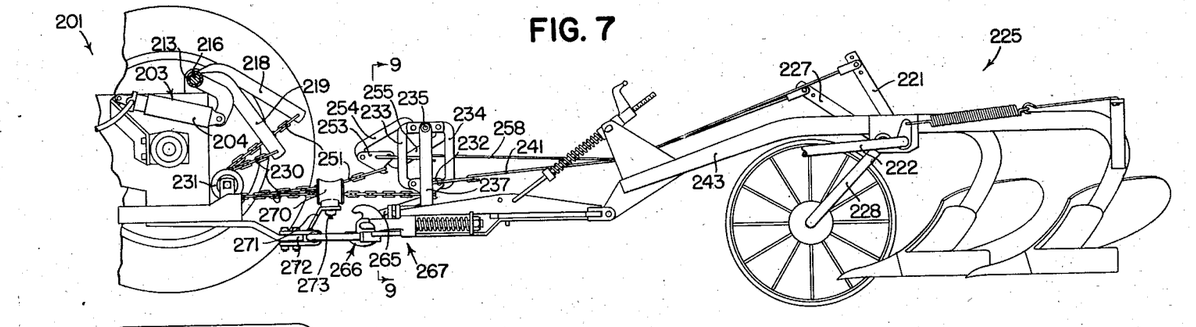
Figure 7 is a view similar to Figure 1 showing a modified form of the present invention in which both the raising and lowering and the leveling of the plow are effected by a pair of power operated units on the tractor, each with its own individual connection to the associated implement part.
Figures 8, 9A:
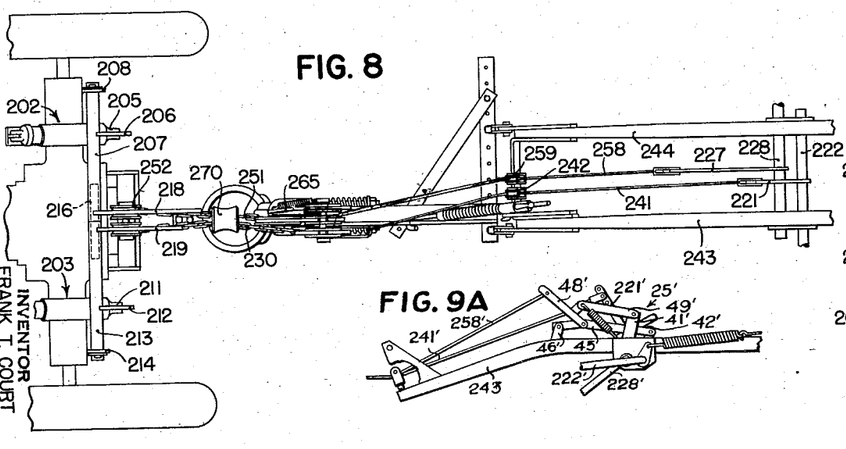
Figure 8 is a partial plan view of the construction shown in Figure 3.
Figure 9A illustrates a modification in which one power unit is connected to level the plow and another power unit is connected to raise and lower the plow.
Figure 9:
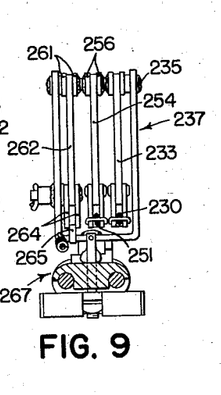
Figure 9 is a section corresponding approximately to a section taken along the line 9—9 of Figure 7, but with both operating parallelogram linkages in a lowered position.

In the construction described above, the connections between the power unit 6 on the tractor and the movable part on the implement effected only a raising and lowering of the tools, the movement of one wheel relative to the other for leveling the plows being effected by a hand lever 48. If desired, this second or leveling adjustment may also be effected by a power unit on the tractor. This is illustrated in Figure 9A and will be described below. Also, by eliminating the hand lever 48 and associated connections and fixing an arm, similar to the arm 153 (Figure 1), to the crank axle 34, and providing a second set of chain and rod connections, with a parallelogram linkage, to a second power unit on the tractor, then both raising and lowering and leveling adjustments can be performed by power from the tractor. Figures 7, 8 and 9 show a modified form in which a tractor is provided with two separate power units, each connected through a set of connections, such as is described above, with the respective crank axles whereby either or both may be raised or lowered as desired.

Referring now more particularly to Figures 7-9, a tractor is indicated in its entirety by the reference numeral 201 and includes a pair of power units 202 and 203, which may be identical except that one is mounted at one side of the tractor while the other is mounted at the other side. Each of the power units 202 and 203 is connected to derive operating energy from a source of power on the tractor, such as a pair of hydraulic pump and valve units, not shown, but which may be like that shown in the co-pending application, Serial No. 412,554, filed September 27, 1941, by Theophilus Brown and Frank T. Court, now U. S. Letters Patent No. 2,311,516, issued February 16, 1943. The power unit 202 includes means serving as a piston rod 205 pivotally connected to an arm 206 fixed to a rock shaft 207 at the right side of the tractor. A bracket 208 receives the laterally outer end of the rock shaft 207 and is fixed to the laterally outer end of the rear axle housing. The left hand power unit 203 is of similar construction, embodying a piston 211 pivoted to an arm 212 that is fixed to a left hand rock shaft 213, the outer end of which is carried on a bracket 214 that is fixed to the left end of the rear axle housing. The adjacent ends of the two rock shafts 207 and 213 are supported by any suitable means, such as a telescopically associated shaft 216 whereby one rock shaft is supported at its inner end on the other. The rock shafts 207 and 213 are capable of independent movement, and an arm 218 is fixed to the inner end of the rock shaft 207 and a similar arm 219 is fixed to the inner end of the other rock shaft 213. The lifting arm 219 is of substantially the same construction as the lifting arm 15 and is connected to an arm 221 on the land wheel crank axle 222 of the plow, which is indicated in its entirety by the reference numeral 225. The plow 225 is, for all practical purposes, identical with the plow 25 shown in Figure 1, except that the hand lever 48 is omitted and an arm 227 fixed to the furrow wheel crank axle 228, the land wheel and furrow wheel crank axles 222 and 228 corresponding, respectively, to the land wheel and furrow wheel crank axles 34 and 33 in Figure 1. By comparing Figures 8 and 9 with Figures 2 and 6, it will be seen that the form of the invention shown in Figures 7-9 is like that shown in Figures 1-6, except that there are two chain and rod connections, rather than one, and that each of such connections is substantially identical with that shown in Figures 1-6 and described above. Hence only a brief description will be necessary. A chain 230 is connected at its forward end with the arm 219 and is trained over a sheave 231 carried by the drawbar support of the tractor. The rear end of the chain 230 is connected by a hook section on a pair of rockable and swingable plates 232 that are supported by a parallelogram linkage including links 233 and 234 which are connected at their upper ends to arms on a shaft 235 rotatably carried at the upper end of a U-shaped standard 237. A flexible rod 241 passes under a sheave 242 at the front ends of the plow beams 243 and 244 and at its front end is engaged with the plates 232 in substantially the same manner that the forward end of the rod 151 (Figure 1) is connected to the plates 141, 142. The rear end of the rod 241 is adjustably connected to the arm 221 that is fixed to the land wheel crank axle 222.

A second chain 251 is connected at its forward end to the other lift arm 218 and is trained over a second sheave 252 carried by the tractor drawbar support. The rear end of the chain 251 is hooked to a pair of triangular rockable and swingable plates 253 that are connected by a pair of parallel links 254 and 255 with a second pair of arms 256 fixed to the shaft 235 (Figure 9). A flexible rod 258 is connected at its front end to the plates 253 at a point substantially midway between the pivots by which the links 254 and 255 are connected to the plates 253, and the flexible rod 258 passes underneath a sheave 259 fixed to the front ends of the plow beams. The rear end of the rod 258 is connected to the arm 227 that is fixed to the furrow wheel crank axle 228. The shaft 235 (Figure 9) carries a third pair of arms 261 to the ends of which a pair of links 262, corresponding to the links 161 and 162 in Figure 5, are pivoted. The lower ends of the links 262 are pivoted to a pair of plates 264 which correspond to the plates 165, 166 in Figure 6, there being a link 265 extending forwardly from the lower apices of the plates 264 and arranged to bear against the hub of the rotatable member 266 of the hitch, which is indicated in its entirety in Figure 7 by the reference numeral 267. Both of the chains 230 and 251 pass through a tubular venturi-like guide or sleeve 270 swiveled on the upper end of a standard 271 fixed to the drawbar 272 of the tractor, as by a bolt 273.

The operation of the form of the invention just described is substantially the same as the operation of the form of the invention shown in Figures 1–6. Briefly, the power unit 202 is connected by flexible means passing adjacent the pivot while the hitch connection with the tractor to the arm 227 that controls the position of the furrow wheel, and the other power unit 203 is connected in a similar fashion with the arm that is fixed to the crank axle of the land wheel, whereby either crank axle may be swung upwardly or downwardly by power, as desired. The hitch 267 is of the spring cushion release type, like that shown in Figures 1–6, and when the springs yield, the plates 264 rock in the same manner as the plates 165, 166 in Figure 6, thereby permitting the shaft 235 to rock. The rocking movement of the latter shaft automatically effects the required amount of increase in the effective length of both of the flexible connections between the lifting arms 218 and 219 and the crank axle arms 227 and 221 so that the yielding of the cushioning springs and the resultant change in the position of the tractor relative to the implement do not affect the positions of the ground wheels. Likewise, when the load becomes excessive and the hitch is automatically disconnected, the anchoring link 265 is freed from the coupling member 266, whereby the swingable plates 232 and 253 are permitted to rock into a position automatically releasing the rear ends of the chains 230 and 251, respectively.

Figure 9A shows an arrangement in which one power unit effects the raising and lowering of the tool while the other power unit effects the leveling, as suggested above. Referring now to Figure 9A, this form of the invention is substantially the same as is shown in Figures 7–9 except that leveling linkage 25', similar to the linkage 25 shown in Figure 1, is employed. The linkage 25' includes an arm 41' connected with the crank axle 228' and a second arm 42' connected with the crank axle 222'. These two arms are connected by the leveling linkage 25' as follows. A link 46' is pivoted to the frame and receives the forward end of a link 45', the rear end of which is pivoted to the arm 42'. A link 49' is pivoted at its rear end to the upper end of the arm 41' and at its forward end is pivoted to an adjusting lever 48', the latter being pivoted to the connecting link 45'. Two lifting cables 241' and 258' are connected, respectively, with separate power units in the same manner as the lifting cables 241 and 258 in Figures 7 and 8, and in the form of the invention shown in Figure 9A the cable 241' is connected to the upper end of the arm 221' which, as in the form of the invention shown in Figures 7 and 8, is connected with the furrow wheel crank axle. The other cable 258' is connected at its rear end to the adjusting lever 48'. Thus, where in Figure 1 the leveling is accomplished by swinging the hand lever 48 manually, in the form of the invention shown in Figure 9A, actuation of the power unit connected with the cable 258' acts to swing the lever 48' and adjust the position of one crank axle relative to the other, thus leveling the plow. By causing the power unit associated with the other cable 241' to exert a forward pull on the arm 221' both crank axles are swung into their raised position.

It will be understood that more than two flexible connections may be provided according to the teachings of the present invention and associated, respectively, with more than two power units on the tractor and more than two movable parts on the implement that are to be controlled. Likewise, it is to be understood that the present invention is not limited to the control of ground working tools but may be applied to any tractor operated agricultural machine in which a movable part or parts are to be controlled, as by adjusting the same into different positions for operation and/or moving the same into a raised or non-operating position. For example, Figure 10 illustrates the application of the present invention to a tractor-propelled combine in which the platform and reel are controlled, respectively, by a pair of power units, such as the hydraulic units 202 and 203 of Figures 7 and 8.

Figure 10:
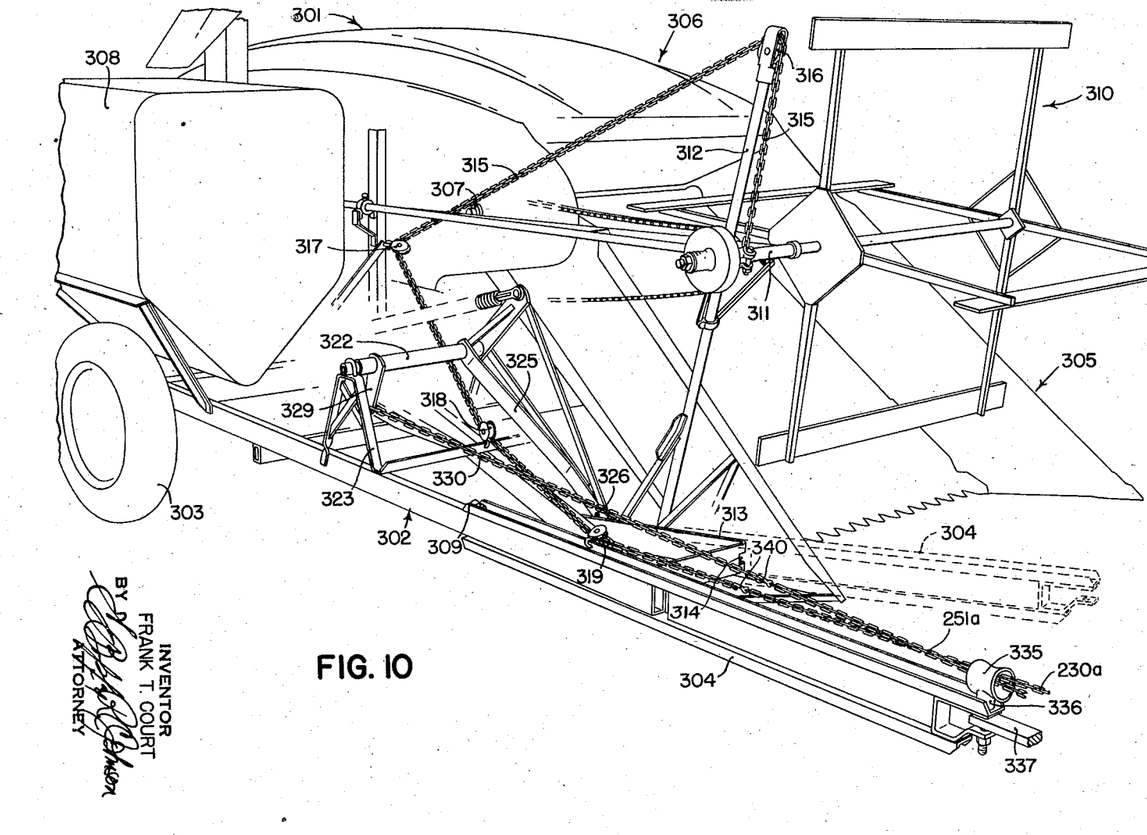
Figure 10 is a perspective view of the application of the principles of the present invention to a combine for adjusting the platform and the reel.

Referring now more particularly to Figure 10, the reference numeral 301 indicates a combine in its entirety, and the combine includes suitable frame means including a hitch frame 302 supported on a pair of ground wheels 303. The combine also includes a platform and cutter bar unit 305 which is pivotally connected for vertical adjustment to the main frame of the combine and arranged to deliver the grain to the cylinder of a threshing unit 306. The axis of vertical swinging of the platform unit is indicated generally by the reference numeral 307. The grain is discharged from the threshing unit to a grain tank unit 308. Mounted adjustably on the platform unit 305 is a reel 310 which is mounted for rotation in a bearing support 311 that is mounted for vertical adjustment along a reel support pipe 312 the lower end of which is connected in any suitable manner to the platform and cutter bar unit 305. For raising and lowering the reel relative to the platform unit, a chain 315 is connected at its lower end to the bearing support 311 and is trained over a sheave 316 mounted on the upper end of the reel support pipe 312. The chain 315 extends downwardly and rearwardly and is trained over a sheave 317 which is connected in any suitable manner to the frame of the combine so as to be in a position fairly close to the axis 307, whereby vertical movement of the platform and cutter bar unit 305 will not affect the position of the reel 310. The chain 315 after passing over the sheave 317 is extended forwardly through a pair of guide sheaves 318 and 319 and is connected to or forms a part of a chain 230a which extends forwardly to a power unit on the tractor (not shown), such as the unit 203 of the tractor 201 of Figure 7.

A rock shaft 322 is mounted by suitable supports 323 on the draft frame 302 and has a long forwardly extending arm 325 connected by a link 326 to the platform unit 305 for raising and lowering the latter. The laterally outer end of the rock shaft 322 has an arm 329 fixed thereto and connected at its lower end to a chain 330, the forward end of which is connected to or forms a part of a chain 251a that corresponds to the chain 251 shown in Figures 7-9. The chain 251a extends to a power unit on the tractor to which the combine is connected. Both of the chains 230a and 251a pass through a venturi-like tube or guide sleeve 335 which is mounted on a pin 336 which serves to connect the rear end of the draft bar 337 of the tractor with the front end of the hitch frame 302. Thus, both of the chains 230a and 251a are supported on the pivotal connection between the implement and the tractor so that turning of the tractor relative to the implement will have no effect on the controls. Since both of the chains 230a and 251a are connected to power units on the tractor, it will be seen that the position of the platform and the position of the reel may be controlled independently by operating the tractor power units. Preferably, each of the chains 230a and 251a include quick detachable connections, such as hooks 340, by which the chains may be disconnected from the platform and reel chains whenever the pivot pin 336 is removed to disconnect the combine from the tractor.

The hitch frame 302 includes a forward section 304 which is pivotally connected, as by a bolt 309 to the main portion of the hitch frame. The forward section 304 is swingable laterally about the pivot bolt 309 into a transport position which disposes the front end of the hitch member 304 more nearly in front of the platform 305. This is for transport purposes so as to reduce the width of the entire outfit, including the tractor. The main portion of the hitch frame 302 includes a lateral bracket 313 having a bolt receiving section 314 by which the forward pivoted hitch section 304 may be secured in its transport position by passing a bolt through suitable openings in the bars making up the forward hitch member 304 and the bolt receiving section 314 just mentioned. The transport position of the member 304 is indicated in dotted lines in Figure 10, and from this figure it will be seen that this readjustment causes very little change in the effective length of the chains 315 and 330. The chain 315 is disposed by the sheaves 318 and 319 fairly close to the pivot bolt 309, and the chain 330 passes substantially over the pivot bolt 309, whereby moving the forward hitch member 304 over to its transport position causes no material change in the position of the reel and platform.

While I have shown and described the preferred structure in which the principles of the present invention have been incorporated, it is to be understood that my invention is not to be limited to the particular details shown and described, but that, in fact, widely different means may be employed in the practice of the broader aspects of my invention.

What I claim, therefore, and desire to secure by Letters Patent is:

1. In a tractor-propelled outfit including a tractor as a source of power and an implement to be propelled thereby, detachable means releasably connecting said implement with the tractor, a power operated unit operated by the tractor and adapted to control implements and the like, connecting means actuated by the latter unit and including a generally rearwardly extending section adapted for detachable connection to said implement to control the latter, and means dependent upon the position of said first detachable means for controlling said detachable connection.

2. In combination, a tractor having an operating unit thereon, an implement having a part adapted to be shifted from one position to another, overload release means for connecting said implement with the tractor and adapted to release upon the occurrence of an abnormal pull, connecting means between said operating unit on the tractor and the part on said implement whereby said operating unit is adapted to shift said part from one position to another, and means responsive to the actuation of said overload release for interrupting the connection between said tractor operating unit and said implement part.

3. An implement adapted to be connected to a tractor to be propelled thereby, comprising a part adapted to be shifted from one position to another, hitch means adapted to connect the implement to the tractor to receive draft power therefrom and including an overload release member movable from one position to another to effect a disconnection between the implement and the tractor upon the occurrence of an overload, means including a pair of connecting elements and an angularly movable member connecting said elements and adapted to be moved to disconnect said connecting elements, said elements being connected with said tractor and said implement part, respectively, and means connecting said angularly movable member with said overload release member whereby when the latter is in a position releasing the implement from the tractor, said angularly movable member is moved into a position disconnecting said connecting element from said implement part.

4. In combination, a tractor having an operating unit thereon, an implement having a part to be shifted from one position to the other, yielding means connecting said implement with the tractor, a generally longitudinally shiftable connection between said operating unit and said part, means responsive to a generally longitudinal relative movement between the implement and the tractor for adjusting the effective length of said connection.

5. In combination, a tractor having an operating unit thereon, an implement having a part thereon adapted to be shifted from one position to the other, cushion means connecting the implement with the tractor and accommodating a limited amount of movement of the implement relative to the tractor, operating connections including longitudinally shiftable means extending from said operating unit on the tractor to the part on said implement, whereby operation of the operating unit on the tractor is effective to adjust the position of said part on the implement, and means responsive to yielding of said cushion means for adjusting the effective length of said longitudinally shiftable means, whereby movement of the implement relative to the tractor incident to the yielding of said cushion means causes substantially no variation in the position of said implement part.

6. In combination, a tractor having a power unit, an implement adapted to be attached thereto and including means for raising and lowering the implement into and out of transport position, means including a flexible element operatively connecting said raising and lowering means with the operating unit of the tractor and including a shiftable part the position of which adjusts the effective length of said flexible element, hitch means connecting the implement with the tractor and including relatively movable parts and spring means resisting said relative movement whereby the transmission of the draft pull is cushioned, and means responsive to the relative movement of said last-mentioned parts for adjusting the position of said shiftable part, whereby the effective length of said flexible element is varied proportionally to the amount of yield of said relative movable parts.

7. An agricultural implement comprising a part adapted to be moved from one position to another, hitch means adapted to connect the implement to a tractor to be propelled thereby, said hitch means including a movable overload releasing member, and means reacting against said overload release member for shifting the position of said implement part.

8. An agricultural implement comprising a part to be shifted from one position to another, hitch means adapted to connect the implement to a source of power and including a member movable from one position to another to cushion the transmission of draft forces and movable into a third position to disconnect the implement from the tractor, and means for shifting said implement part from one position to another including a member movable from one position to another to accommodate the movement of said hitch member from its one position to its said other position, said second mentioned member being movable into a third position to release the connection to said implement part, and means connecting said members, whereby the position of said hitch member controls the position of said second mentioned member, the latter being movable into its third position when said hitch member is moved into its third position.

9. In a tractor propelled outfit, the combination of an implement, a tractor having a power operated lifting unit thereon, tool means on the implement adapted to be raised and lowered, a part movable on the implement for raising and lowering said tool means, a cushion hitch member movable from one position to another when yielding in response to draft loads and movable into a third position to release the implement upon the occurrence of a predetermined overload, an operating connection extending between the power unit on the tractor and the implement raising and lowering part, said operating connection including means operable when said hitch member moves from said one position to the other position for adjusting said operating connection to accommodate the consequent changes in the position of the implement relative to the tractor, and means operable when said hitch member moves into its third position releasing the implement from the tractor for interrupting the operating connection between the power unit on the tractor and the implement raising and lowering part to accommodate the separation of the implement from the tractor by the movement of said hitch member into its said third position.

10. An implement adapted to be connected to a tractor having a power unit thereon, said implement comprising tool means adapted to be raised and lowered into and out of operating position, hitch means for connecting said implement with the tractor and including a yieldingly mounted member movable for cushioning the transmission of draft forces between the tractor and the implement, an operating connection between the tractor power unit and the tool means for raising and lowering the latter, said connection comprising two longitudinally movable sections and an angularly movable member to which the adjacent ends of said sections are connected, changes in the angular position of said member serving to change the effective length of said sections, and means whereby movement of said hitch member controls the movement of said angularly movable member.

11. An implement comprising tool raising and lowering means, longitudinally shiftable means for moving said tool raising and lowering means, said longitudinally shiftable means including a pair of sections and an angularly shiftable member to which the adjacent ends of said sections are connected in spaced apart relation, means restraining said member against angular movement while accommodating movement of said member and both of said sections generally longitudinally to effect operation of said raising and lowering means, and means controlling changes in the angular position of said member for controlling the effective length of said operating connection.

12. An agricultural implement having a part adapted to be shifted from one position to another, a pair of longitudinally movable elements, one connected with said implement part, an angularly movable member connected with the adjacent ends of said elements whereby angular movement of said member moves said elements one with respect to the other, a second angularly movable member, means pivotally supporting the latter for angular movement about an axis, parallel link means connecting said members to provide movement of one member with respect to the other but without changing the angular position of either, means for moving said elements and the angularly movable member connected therewith for shifting the position of said implement part, and means connected with said second mentioned angularly movable member for controlling the connections between said elements.

13. A tractor-propelled outfit comprising a tractor having power operated means including a pair of independently movable arms, an implement adapted to be hitched to the tractor and including a pair of parts independently movable, hitch means for connecting the implement to the tractor and including yielding means, a pair of relatively movable parts, one adapted to be connected with the tractor and the other connected with the implement and one movable relative to the other when said yielding means yields, and means whereby said part moves into a third position accommodating the release of the implement from the tractor upon the occurrence of an overload, a connection extending from one of the power operated arms on the tractor to one of the movable implement parts, a second connection extending from the other of said arms to the other implement part, whereby operation of said arms controls, respectively, said implement parts, each of said connections including a parallelogram linkage, an angularly movable part, the angular position of which determines the effective length of the associated connection, and a common rockable member to which a portion of the parallelogram linkage is connected, rotation of said rockable member controlling the angular position of both of said angularly movable members, but said latter members being free to swing generally fore and aft by virtue of said parallelogram linkage without changing their angular positions, and controlling means for said rockable member comprising a pair of links connected with said rockable member, an angularly movable member connected to said links whereby said last mentioned angularly movable member controls the position of said rockable member and said first mentioned angularly movable members, and means responsive to a disconnection of said hitch means for accommodating the angular movement of all of said angularly movable members, whereby both of said connections are interrupted when said hitch means is disconnected.

14. An agricultural implement comprising a ground working tool, hitch means connected with said ground working tool for generally vertical swinging movement, a movable part movably connected with said tool and reacting against the ground for raising said tool upwardly relative to the ground, raising means disposed forwardly of the point of connection of said hitch means with said tool, means connecting said raising means with said part for operating the latter, and means acting between said connecting means and said tool whereby the pull transmitted through said flexible means against said part establishes a component tending to prevent downward displacement of the forward portion of said tool.

15. A plow including a generally fore and aft extending plow beam having a furrow opener at the rear portion thereof, a crank axle swingably connected with said plow beam, a ground wheel journaled on said crank axle, an arm connected with said crank axle for swinging the latter so as to react against the ground for raising said furrow opener, means for swinging said crank axle including a generally longitudinally extending flexible element connected at its rear end to said arm and adapted when a forward pull is transmitted therethrough to cause said arm to swing said crank axle downwardly and raise said furrow opener, and means connected between said flexible element and the forward portion of said plow beam to prevent the latter from swinging downwardly when a pull is exerted through said flexible element against said arm.

16. The combination of a tractor having a source of power, an agricultural implement having ground working tool means adapted to be raised and lowered relative to the ground, hitch means movably connecting said agricultural implement with the tractor, means deriving power from said source of power on the tractor for raising said ground working tool means and including a generally longitudinally shiftable part movement of which is adapted to raise said ground working tool, and means supporting said shiftable part on said hitch means.

17. The combination of a tractor having a pair of independently movable parts thereon, an agricultural implement connected with the tractor and including a working unit movable into various working positions and also movable into a raised position, means on the implement for adjusting the position of said working unit, means on the implement for raising said working unit, and a pair of flexible elements, one connected between one of said tractor parts and said position adjusting means and the other connected between the other tractor part and said raising means.

18. The combination of a tractor having a pair of independently movable parts thereon, an agricultural implement connected with the tractor and including a working unit movable into various working positions and also movable into a raised position, means on the implement for adjusting the position of said working unit, means on the implement for raising said working unit, a pair of flexible elements, one connected between one of said tractor parts and said position adjusting means and the other connected between the other tractor part and said raising means, and a Venturi-like tubular guide member carried by the tractor and receiving both of said flexible elements.

19. In combination, a tractor, an implement having a part adapted to be shifted from one position to another, overload release means for connecting said implement with the tractor and adapted to release upon the occurrence of an abnormal pull, connecting means between said tractor and the part on said implement for controlling said part, and means responsive to the actuation of said overload release for interrupting the connection between said tractor and said implement part.

20. In combination, a tractor, an implement, overload release means for connecting said implement with the tractor and adapted to release upon the occurrence of an abnormal pull, a disconnectible control connection between the implement and the tractor, and means responsive to the actuation of said overload release for disconnecting said control connection.

21. In combination, a tractor, an implement, releasable means for connecting said implement with the tractor, a disconnectible control connection between the implement and the tractor, and means responsive to the release of said releasable means for disconnecting said control connection.

22. In combination, a tractor, an implement having a part to be shifted from one position to the other, yielding means connecting said implement with the tractor, a connection between said tractor and said part, means responsive to a relative movement between the implement and the tractor for adjusting the effective length of said connection.

23. An agricultural implement comprising a part adapted to be moved from one position to another, hitch means adapted to connect the implement to a tractor to be propelled thereby, said hitch means including a yieldable member, and means reacting against said yieldable member for shifting the position of said implement part.

24. In combination, a tractor, an implement having a part to be shifted from one position to the other, yielding means connecting said implement with the tractor, means for shifting said part, and means associated with said shifting means and responsive to yielding of said yielding means for compensating for the change in the relative position of said tractor and implement when said yielding means yields.

25. In combination, a tractor having an operating unit thereon, an implement having a part adapted to be shifted from one position to another, overload release means for connecting said implement with the tractor and adapted to release upon the occurrence of an abnormal pull, connecting means between said operating unit on the tractor and the part on said implement and including members acting in tension to transmit force and releasable mechanism connecting said tension members, whereby said operating unit is adapted to shift said part from one position to another, and means responsive to the actuation of said overload release for releasing said releasable mechanism and thereby interrupting the connection between said tractor operating unit and said implement part.

FRANK T. COURT.